3,089,863
PROCESS FOR PREPARATION OF A POLYESTER RESIN OF PENTAERYTHRITOL, A DICARBOXYLIC ACID ANHYDRIDE, AND A MONOEPOXIDE
Darrell D. Hicks and John E. Masters, Louisville, Ky., assignors to Devoe & Raynolds Co., Inc., a corporation of New York
No Drawing. Filed June 29, 1956, Ser. No. 594,716
1 Claim. (Cl. 260—75)

This invention relates to new synthetic resins of the polyester type. In one of its aspects the invention pertains to a new class of branched chain polyester thermoplastic resins. In another of its aspects the invention provides a process for preparing novel polyesters of extremely high molecular weight having utility in the textile field. In accordance with still another of its aspects the invention provides a method for the preparation of unsaturated polyesters which can be cured by known methods to produce useful potting, casting, molding and laminating compositions.

Conventionally, polyesters are formed by condensing dibasic acids or their anhydrides with polyhydric alcohols under esterification conditions, that is, conditions whereby there is a liberation of water. By these known processes, when the functionalities of the acid and of the alcohol do not exceed two, thermoplastic resins result. These resins, however, are not multi-branched chain compositions. Branched chain, thermoplastic resins can be made by the use of compounds having functionalities greater than two, if these compounds are used in small proportions. However, when reactants having functionalities greater than two are used, functional groups are free to react with each other. Under reaction conditions generally employed, functional groups tend to react with each other to form three dimensional or cross-linked structures, making it very difficult to produce thermoplastic non-cross-linked resins having a plurality of branch chains. It is also difficult, if not impossible, to make high molecular weight thermoplastic polyesters. To form thermoplastic resins from polyfunctional reactants, the product generally must be modified by monofuctional chain stoppers to prevent functional groups from forming three dimensional structures. Hence, highly branched chain, non-cross-linked polyesters of high molecular weight are virtually unknown.

In accordance with this invention, however, branched chain, thermoplastic polyester resins having extremely high molecular weights can be prepared. The invention contemplates making monomeric additions to terminal groups under conditions whereby functional terminal groups do not react with each other. Further, by this invention, a new class of polyester polymers is provided, each polyester having a multiplicity of linear non-cross-linked polyester branch chains.

In the practice of this invention, rather than reacting a polycarboxylic acid solely with a polyfunctional alcohol, difunctional polymer-forming reactants are combined in the presence of a polyfunctional nucleus-forming compound. The difunctional polymer-forming reactants are dibasic acid anhydrides and monoepoxides. A dibasic acid anhydride and a monoepoxide, if pure, will not react. A dibasic acid anhydride will, however, react with an alcoholic hydroxyl group even at relatively low temperatures to form the half-ester. A monoepoxide, on the other hand, reacts more readily at low temperatures with carboxyl groups than with hydroxyl groups. Both the reaction between an anhydride and a hydroxyl, and the reaction between a monoepoxide and a carboxyl take place at a temperature below a normal esterification temperature. Since anhydrides and monoepoxides will not react with each other, it is necessary to initiate the reaction with a group reactive with the monoepoxide to form a hydroxyl group which in turn will react with the anhydride; or an initiator which will react with the anhydride to form the half-ester thus providing a carboxyl group for reaction with the monoepoxide. Or the initiator may be reactive with both an anhydride and a monoepoxide.

As an example, assume that glycerin is employed as an initiator. Since temperatures below esterification temperatures are employed, the glycerin will not readily react with the monoepoxide but will react with three mols of the dibasic acid anhydride to form a compound containing three carboxyl groups. These three carboxyl groups in turn will react with three mols of monoepoxide to form a compound containing three hydroxyl groups which then can react with additional dibasic acid anhydride. Thus, anhydride and monoepoxide monomers add alternately to the initiator, forming branch chains. The initiator is a compound which will react with a monoepoxide and/or a dibasic acid anhydride to form either hydroxyl groups for reaction with anhydride or carboxyl groups for reaction with monoepoxide, in other words a compound containing active hydrogens. It is noted that the terminal groups of the molecule can not react with each other or with terminal groups of other resin molecules. The terminal groups of the molecule can only react with unreacted epoxide or anhydride, depending upon whether or not the terminal group is a hydroxy or carboxyl group. If an excess of either monoepoxide or of dibasic acid anhydride is used, the molecule will terminate. A hydroxy terminated compound is formed if the monoepoxide is in excess and a carboxy terminated compound is formed if the anhydride is in excess. If equimolecular quantities of dibasic acid anhydride and monoepoxide are used the molecule will contain both carboxyl and hydroxyl terminal groups. Since the monoepoxide and dibasic acid anhydride do not readily react with each other, and since either or both must first react with a third compound, it is seen that this compound functions as a reaction center from which branches emanate by alternate monomeric additions of dibasic acid anhydride and monoepoxide. The nucleus-forming compound thus functions as a reaction center from which a number of linear polyester, polymeric chains emanate, the number of chains being equal to the functionality of the nucleus-forming compound.

In accordance with an embodiment of this invention, therefore, dicarboxylic acid anhydrides and monoepoxides are utilized as polymer-forming reactants, the reaction being initiated with a nucleus-forming compound, to which the polymer-forming reactants are joined to form branch chains. As the nucleus-forming compound, it is desirable to employ certain polyfunctional compounds containing active hydrogens whereby said nucleus-forming compound is capable of reacting with an epoxide or an anhydride or both. In other words, the initiator will be an acid, an alcohol, or a phenol, each having a functionality of at least three, or a polyfunctional compound such as a copolymer, an ester or an ether having carboxyl-substituents, and/or phenolic hydroxyl or alcoholic hydroxyl substituents. Examples of such initiators are trihydric phenols such as phloroglucinol, 1,2,4-trihydroxybenzene, polybasic acid such as tricarballylic acid, aconitic acid, pryomellitic acid, and polyfunctional alcohols having at least three alcoholic hydroxyl groups, for example, glycerol, erythritol, pentaerythritol, and polypentaerythritol, e.g., dipentaerythritol, etc. Included as initiators having carboxyl, phenolic hydroxyl, or alcoholic hydroxyl substituents are polymers and copolymers. For example, a bisphenol terminated bisphenol-epihalohydrin condensate can be used which is prepared by reacting, in aqueous medium, $n$ mols of the epihalohydrin with $n+1$ mols of bisphenol using $n$ mols of an alkali (plus 10 percent molar excess), for example, sodium, potassium, or calcium hydroxide. This reaction is usually carried out by adding the halohydrin to the mixture of bisphenol, alkali, and water at about 50° C., raising the temperature to 100° C. The polymer thus formed is subsequently washed after neutralizing the water medium with HCl or $H_3PO_4$. The product is a linear polyether polymer terminated with bisphenol and containing intermediate alcoholic hydroxyl groups. The terminal hydroxyl groups, i.e., those attached to the terminal bisphenol groups, are phenolic hydroxyls.

Also included are copolymers containing a large number of carboxyl groups, for example, the copolymers of vinyl toluene and acrylic acid, or copolymers of vinyl acetate and crotonic acid, etc. These copolymers have as many as 100 carboxyl groups per linear chain and from such copolymers a wide variety of novel resinous compositions can be prepared having branch chains equal to the number of carboxyl groups per linear chain of copolymer. Another group of initiators within the contemplation of this invention includes compounds having both carboxyl and alcoholic hydroxyl substituents. For example, some of the carboxyl groups, but not all, of a vinyl toluene-acrylic acid copolymer can be reacted with a monoepoxide to form a carboxy-hydroxy initiator. Still another group of initiators within the contemplation of this invention includes carboxyl-containing and phenolic hydroxyl-containing compounds. Thus, bisphenol terminated bisphenol-epihalohydrin condensates made as set forth hereinbefore by reacting $n$ mols of epihalohydrin with $n+1$ mols of bisphenol in the presence of $n$ mols of sodium hydroxide (plus 10 percent molar excess) can be partially esterified with a dicarboxylic acid or anhydride to produce a compound containing phenolic hydroxyl radicals, carboxyl radicals, and, if desired, alcoholic hydroxyl radicals. Other bisphenol-epihalohydrin condensates are also contemplated, for example, a polyhydroxy polyether condensate of bisphenol, epichlorohydrin, and ethylene chlorohydrin containing six alcoholic hydroxyl groups as described in Part (a) of Example 7. Intended also as polyfunctional initiators from which branch chains emanate are polyvinyl alcohol, sorbitol, pentaerythritol, and partial esters made by condensing three mols of pentaerythritol with two mols of phthalic acid or anhydride to produce a neutral compound having eight hydroxyls per mol. Or 2 mols of pentaerythritol can be condensed with one mol of phthalic to give a six-hydroxy compound, etc.

In the preparation of the polyester resins of this invention the three reactants are combined and reacted under such conditions that no formation of water takes place during the reaction. In other words, the reaction is conducted under sufficiently mild conditions, for example, a temperature sufficient to bring about the carboxyl-epoxide reaction, yet not sufficiently high to bring about a carboxyl-hydroxyl, or esterification, reaction which would result in the formation of water, generally a temperature not exceeding 150° C. Desirably the nucleus-forming initiator, and the dibasic acid anhydride are combined and the monoepoxide is slowly added thereto. By this method the temperature can more readily be controlled, since in most instances the reaction is exothermic, especially during its early stages. The temperature desirably is maintained in the range of 115° C. to 130° C.

As the polyester is formed there is a progressive reduction in acid number. In some instances, particularly in the case of high molecular weight initiators, it is sometimes desirable to employ an inert catalyst, tertiary amines being suitable for the purpose.

Monoepoxides within the contemplation of this invention are epoxy compounds having three-membered epoxide rings and free of other reactive groups, particularly groups capable of reacting with an acid anhydride. Included is oxirane, or ethylene oxide, as well as the alkyl oxiranes, for example, methyl oxirane or propylene oxide, butene-2-oxide, etc. Among others are ethers and esters containing only one three-membered epoxide substituent, each free of other groups capable of reacting with an acid anhydride. Examples are phenyl glycidyl ether, isopropyl glycidyl ether, glycidyl benzoate, butyl glycidyl ether, allyl glycidyl ether, glycidyl acrylate, a glycidyl methacrylate, glycidyl crotonate, glycidyl acetate, etc. With reference to unsaturated monoepoxide, some degree of selection must be exercised. For instance, the use, in the practice of this invention, of an unsaturated monoepoxide with an unsaturated dibasic acid anhydride results in the formation of cross-linked thermosetting compositions. Since cured compositions result, the use of an unsaturated monoepoxide in conjunction with an unsaturated dibasic acid anhydride is not suggested in making thermoplastic resins according to this invention. In other words, a monoepoxide containing a double bond such as allyl glycidyl ether, or glycidyl acrylate, desirably is not employed with an unsaturated acid anhydride, such as maleic acid anhydride. It is preferred to employ an unsaturated acid anhydride with a saturated monoepoxide.

Dicarboxylic acid anhydrides applicable to this invention include both aliphatic and aromatic dicarboxylic acid anhydrides, either saturated or unsaturated, for example, succinic, adipic, maleic, glutaric, phthalic, isosuccinic, and sebacic anhydrides, naphthalene dicarboxylic acid anhydrides, etc. Endo-cis-bicyclo-(2,2,1)-5-heptene-2,3-dicarboxylic anhydride (sold under the trademark "Nadic" anhydride) and 1,4,5,6,7,7-hexachlorobicyclo-(2,2,1)-5-heptene-2,3-dicarboxylic anhydride (sold under the trademark "Chlorendic" anhydride) are also desirable.

One of the advantages of this invention is that highly branched chain thermoplastic polyesters are prepared following the invention. If a highly functional initiator is used according to the invention dibasic acid anhydride and monoepoxide add alternately through each reactive group to produce highly branched chain compounds. These branch chains do not cross-link as in conventional processes because in this process esterification conditions are not employed. In prior processes now in use end groups react due to esterification. In accordance with this invention monomers add to the initiator to form branch chains without the formation of water. For example, if a compound having twelve or fifteen carboxyl or alcoholic hydroxyl radicals is used as an initiator a polyester will be formed having twelve or fifteen branch chains since the initiator becomes the nucleus from which the branch chains emanate, the number of branch chains being equal to the functionality of the initiator. As a further example, polyesters have been prepared having one hundred or more branch chains. Thus, a copolymer of vinyl toluene and hydroxy propyl acrylate has been prepared by known polymerization methods to give a product having about one hundred alcoholic groups per linear chain.

Desirable polyesters have been prepared with hydroxy or carboxy copolymers as initiators by reacting propylene oxide and maleic anhydride in the presence of these copolymers. It is understood that in the preparation of these polyesters a modicum of initiator is used in proportion to the monoepoxide and dibasic acid anhydride since the function of the initiator is to serve as a nucleus from which the branch chains emanate. A very small amount of initiator is used if a high molecular weight product is desirable. And, as the amount of initiator or nucleus-forming material is increased, the length of branch chains is decreased. Thus, if glycerin were employed as the initiator and one mol of glycerin was employed with sixty mols of monoepoxide and sixty mols of dibasic acid anhydride on the average each branch chain in the linear polyester would contain twenty mols of monoepoxide and twenty mols of anhydride. However, if two mols of glycerin were employed, rather than one, each branch chain in the polyester would normally contain ten mols of monoepoxide and only ten mols of dibasic acid anhydride. It is apparent then that the more initiator or nucleus-forming compound used, the shorter the branch chains will be. The ratio of reactants to initiator therefore depends upon the desired size of the molecule and proportions are not critical. The number of branch chains will be equal to the functionality of the nucleus-forming initiator and the length of each branch chain will be approximately equal to the total number of mols of monoepoxide plus the total number of mols of anhydride per mol of nucleus-forming compound, divided by the functionality of the nucleus-forming compound. In the light of these considerations, the amount of monoepoxide and dibasic acid anhydride to be reacted in the presence of the initiator can readily be determined in each case by one skilled in the art. As a general statement, it can be said that the mol ratio of monoepoxide to anhydride is in the range of 2:1 to 1:2 and the mol ratio of anhydride plus monoepoxide to nucleus-forming initiator is greater than 7:1.

A feature of this invention is that unsaturated polyesters can be prepared which can be subsequently cured, for example, with vinyl monomers, to give desirable castings and pottings. These compositions which can be cured with a vinyl monomer, are made by the use of an unsaturated dibasic acid anhydride or an unsaturated monoepoxide as a reactant. The use of, say, maleic acid anhydride, results in the presence of recurring double bonds in each branch chain. Double bonds in each branch chain will also result from the use of an unsaturated monoepoxide. For example, allyl glycidyl ether can be used. However, as indicated, it is undesirable to employ an unsaturated monoepoxide in combination with an unsaturated dibasic acid anhydride, for instance, allyl glycidyl ether in combination with maleic acid anhydride. In addition, coatings, castings and pottings can also be prepared by reacting both saturated or unsaturated polyesters of this invention with urea-formaldehyde resins.

An advantage of this invention is that polyesters can be prepared having molecular weights approximately equal to any desired molecular weight. The proportions of reactants to give a linear polyester of a theoretical molecular weight can be calculated and when these proportions are used a polyester can be prepared which has a molecular weight which corresponds approximately with the calculated theoretical molecular weight. When an initiator is used which is capable of reacting only with an organic acid anhydride, the following formula can be used to theoretically calculate the molecular weight of the polyester which it is desired to prepare.

$$mwS + mwA \cdot nA + mwE[nA - (f-z)] = mwP$$

In this formula $mwS$ represents the molecular weight of the initiator, $mwA$ represents the molecular weight of the dibasic acid anhydride and $mwE$ represents the molecular weight of the monepoxide, $mwP$ is the theoretical molecular weight of the polyester, $nA$ represents the number of mols of anhydride, $f$ represents the functionality of the initiator, and $z$ represents the number of terminal hydroxy groups desired in the polyester. From this equation and using a desired theoretical molecular weight of the polymer, the number of mols of anhydride can be calculated. The formula is based upon a ratio of initiator to anhydride to epoxide of 1 to $nA$ to $nA-(f-z)$. The number of mols of eopxide, therefore, can be derived from $nA-(f-z)$ since $nA$, $f$ and $z$ will all be known quantities. Referring again to $z$, when the initiator is capable of reacting with an epoxide group and not an anhydride the formula is the same but $z$ represents the number of terminal carboxyl groups desired.

In carrying out this invention it is generally desirable to melt the mixture of dibasic acid anhydride and initiator, to slowly add the monoepoxide, while heating the reaction mixture at a temperature of 120° C. to 150° C. until there is no change in acid value. In many instances, acid values of from 1 to 10 will be obtained, indicating substantially complete reaction and a product approaching the theoretical. However, in some cases, as where polymeric nuclei having a functionality of over 100 are used, acid values up to 20 are usually obtained, especially where very high molecular weight products are being prepared. In the case of low boiling monoepoxides rather than taking acid numbers it is convenient to judge the reaction by the reflux. After all of the low boiling monoepoxide has been added, the temperature is raised as reflux permits, to approximately 150° C. and this temperature is maintained until reflux ceases, indicating that monoepoxide has been consumed. If a higher boiling monoepoxide is employed, that is, one having a boiling point above 140° C. to 150° C., no reflux will be observed.

For a further understanding of the invention, reference is made to the following specific examples, the viscosities given being Gardner-Holdt viscosities run at 25° C. These examples are intended to be illustrative of the invention only, since different embodiments can be made without departing from this invention.

*Example 1*

To prepare a branched chain thermoplastic polyester having three branch chains and a theoretical molecular weight of 4436, propylene oxide, glycerin, maleic anhydride and phthalic anhydride are employed in a mol ratio of 11½ to ⅓ to 4 to 4. The glycerin (21.8 grams), maleic acid anhydride (279.7 grams) and phthalic acid anhydride (422.4 grams) are heated together in a two liter, three neck, round bottom flask provided with a stirrer, thermometer, dropping funnel and a Dry Ice condenser. When the temperature in the reaction vessel reached 120 to 125° C., propyleneoxide (475.9 grams) is added through the dropping funnel to the flask contents at a rate sufficient to maintain a heavy reflux at a temperature of 120° C. The drop-wise addition of the propylene oxide requires approximately twelve hours. When all of the propylene oxide is added, and the reflux diminishes, the temperature of the flask contents is raised to 150° C. as the reflux permits, and held at this temperature until reflux ceases. The product is then heated under vacuum, distilling off the volatiles at 2 mm. Hg for ten minutes. Constants on the resulting product are: Acid value—39; viscosity—W–X @ 66.7 percent solids in styrene; color—5–6 @ 66.7 percent solids in styrene.

Strength properties on the preceding product are determined on specimens machined from sheet castings prepared by casting blends of the polyester, with styrene, using a catalyst. The molds are made from two 8" x 12" x ¼" glass plates wrapped with cellophane so that one side of each plate is free of wrinkles. These plates are then assembled, smooth side inward, into a mold by using ¼" polyvinyl chloride-acetate plastic tubing as a gasket on three of the four edges, and using six C-clamps to hold the two plates together. The clamps are tightened so as to form a 3/16" cavity between the glass plates. The resin solutions are poured into the mold, while the latter is in a vertical position. The catalyst is a paste of fifty percent benzoyl peroxide, and fifty percent tricresyl phosphate.

Styrene (120 grams) containing 500 p.p.m. tertiary butyl catechol, and the product of this example (180 grams) are blended together using heat to effect solution. This solution is cooled to 25° C. to 30° C. and catalyst (six grams) is added. The resulting solution is poured into a mold of the type described above. The mold is placed upright in a 75° C. oven and allowed to remain one hour. The oven temperature is then raised to 121° C. and the mold contents are held at this temperature for one hour. The mold contents are then removed from the oven, allowed to cool to 30° C. to 40° C., and the resulting casting removed from between the glass plates. This casting is clear and very hard, having the following strength properties on the casting:

| | |
|---|---|
| Tensile strength_____p.s.i__ | 7,700 |
| Flexure strength_____p.s.i__ | 15,100 |
| Impact strength_____ft. lb./inch of notch__ | 0.29 |
| Alpha-hardness _____ | 112 |

*Example 2*

In order to prepare a branched chain thermoplastic polyester having three branch chains and a theoretical molecular weight of 2264, propylene oxide, glycerin, maleic anhydride and phthalic anhydride are employed in a mol ratio of 11 to ⅔ to 4 to 4. The glycerin (43.7 grams), maleic acid anhydride (279.4 grams), phthalic acid anhydride (421.9 grams) and propylene oxide (454.8 grams) are reacted together following the procedure described in Example 1. The addition of the propylene oxide requires approximately nine hours, after which the temperature is raised to 150° C. until reflux ceases. The products, after being vacuum distilled, have the following properties: Acid value—19; viscosity—P–Q @ 66.7 percent solids in styrene; color—4–5 @ 66.7 percent solids in styrene.

Styrene (120 grams) containing 500 p.p.m. tertiary butyl catechol, and the product of this example (180 grams) and catalyst (six grams) are blended together and processed as in Example 1 to the stage where a casting is obtained. A clear, rigid casting is obtained which has the following strength properties:

| | |
|---|---|
| Tensile strength_____p.s.i__ | 6500 |
| Flexure strength_____p.s.i__ | 13,500 |
| Impact strength_____ft. lb./inch. of notch__ | 0.25 |
| Alpha-hardness _____ | 109 |

*Example 3*

To prepare a branched chain thermoplastic polyester having four branch chains and a theoretical molecular weight of 5928, propylene oxide, pentaerythritol, maleic anhydride, and phthalic anhydride are employed in a mol raito of 11½ to ¼ to 4 to 4. The pentaerythritol (24.1 grams), maleic acid anhydride (279.1 grams), phthalic acid anhydride (421.5 grams), and propylene oxide (475.0 grams) are reacted together in accordance with Example 1. The addition of the propylene oxide to the flask contents requires approximately fifteen hours. After adding the propylene oxide, raising the temperature to 150° C. until there is no reflux, and vacuum distilling the product for ten minutes at 2 mm. Hg, the following constants are obtained on the product; Acid value—11; viscosity—Z–Z₁ @ 66.7 percent solids in styrene; color—4–5 @ 66.7 percent solids in styrene.

Properties of the product are determined as in Examples 1 and 2 by blending styrene (120 grams) containing 500 p.p.m. (parts per million) tertiary butyl catechol, the product of Example 2 (180 grams), and catalyst (six grams), by preparing a casting therefrom using the procedure of the second paragraph of Example 1. The resulting casting is clear, very hard and has the following strength properties:

| | |
|---|---|
| Tensile strength_____p.s.i__ | 7700 |
| Flexure strength_____p.s.i__ | 17,400 |
| Impact strength_____ft. lb./inch of notch__ | 0.30 |
| Alpha-hardness _____ | 111 |

*Example 4*

To prepare a branched chain thermoplastic polyester having four branch chains and a theoretical molecular weight of 4432, propylene oxide, pentaerythritol, maleic anhydride, and phthalic anhydride are employed in a mol ratio of 11 to ½ to 4 to 4. The pentaerythritol (48.2 grams), maleic acid anhydride (278.3 grams), phthalic acid anhydride (420.2 grams), and propylene oxide (453.0 grams) are reacted together in a manner described in Example 1. The addition of the propylene oxide requires approximately thirteen hours. The product is then taken to 150° C., held until reflux ceases, and vacuum distilled for ten minutes at 2 mm. Hg. Constants found on the product are as follows: Acid value—11; viscosity—V–W @ 66.7 percent solids in styrene; color— 3–4 @ 66.7 percent solids in styrene.

Styrene (120 grams) containing 500 p.p.m. tertiary butyl catechol, the product of this example (180 grams), and catalyst (six grams) are blended together and processed to a cast sheet, using the procedure of Example 1. The resulting casting is clear and rigid, having the following strength properties:

| | |
|---|---|
| Tensile strength_____p.s.i__ | 6500 |
| Flexure strength_____p.s.i__ | 13,500 |
| Impact strength_____ft. lb./inch of notch__ | 0.25 |
| Alpha-hardness _____ | 111 |

*Example 5*

In order to prepare a branched chain thermoplastic polyester having four branch chains and a theoretical molecular weight of 1584, propylene oxide, pentaerythritol, maleic anhydride and phthalic anhydride are employed in a mol ratio of 11 to 1 to 4 to 4. The pentaerythritol (92.8 grams), maleic acid anhydride (267.5 grams), phthalic acid anhydride (404.0 grams) and propylene oxide (435.5 grams) are reacted together using the procedure described in Example 1. The addition of the propylene oxide requires approximately ten hours. After raising the temperature to 150° C., and maintaining this temperature until reflux ceases, the resulting product is vacuum distilled ten minutes at 2 mm. Hg. Constants on the product are as follows: Acid value—7; viscosity—N–O @ 66.7 percent solids in styrene; color— 1–2 @ 66.7 percent solids in styrene.

Styrene (120 grams) containing 500 p.p.m. tertiary butyl catechol, the product of this example (180 grams), and catalyst (six grams) are blended together and a casting is prepared from this solution using the procedure of Example 1. The following strength properties are obtained from this casting:

| | |
|---|---|
| Tensile strength_____p.s.i__ | 5800 |
| Flexure strength_____p.s.i__ | 11,000 |
| Impact strength_____ft. lb./inch of notch__ | 0.25 |
| Alpha-hardness _____ | 103 |

*Example 6*

In order to prepare a branched chain thermoplastic polyester having six branch chains and a theoretical molecular weight of 2606, using dipentaerythritol as the initiator, propylene oxide, dipentaerythritol, maleic anhydride, and phthalic anhydride are employed in a mol ratio of 11 to ⅓ to 4 to 4. The dipentaerythritol (61.2 grams), maleic acid anhydride (275.5 grams), phthalic acid anhydride (415.9 grams) and propylene oxide (448.4 grams) are reacted together following the procedure set forth in Example 1. The addition of propylene oxide to the flask contents requires approximately 15 hours after which the temperature is raised to 150° C. as the reflux permits. Temperature is held at 150° C. until reflux ceases and the product is then vacuum distilled for ten minutes at 2 mm. Hg. A product having the following constants results: Acid value—3; viscosity—W–X @ 66.7 percent solids in styrene; color—4–5 @ 66.7 percent solids in styrene.

Styrene (120 grams) containing 500 p.p.m. tertiary butyl catechol, the product of this example (180 grams) and catalyst (six grams) are blended together and made into a casting using the procedure described in Example 1. The blend produces a clear, rigid casting which possesses the following strength properties.

| | |
|---|---|
| Tensile strength_____p.s.i__ | 6600 |
| Flexure strength_____p.s.i__ | 15,000 |
| Impact strength_____ft. lb./inch of notch__ | 0.26 |
| Alpha-hardness _____ | 112 |

Example 7

*Part (a).*—A polyhydroxy polyether is prepared by reacting bisphenol, epichlorhydrin, ethylene chlorhydrin, and sodium hydroxide in the following molar ratios:

5 mols bisphenol
4 mols epichlorhydrin
2 mols ethylene chlorhydrin
6.9 mols sodium hydroxide In a suitable vessel, bisphenol (1284 grams), sodium hydroxide (311 grams), and water (3110 grams) are combined and heated to 50° C. To this reaction mixture epichlorhydrin (417 grams) and ethylene chlorhydrin (181 grams) are added. The temperature of the mixture is raised to 95–100° C. and held for 1½ hours. The product, washed until it is neutral to litmus, and dried, has a melting point of 98° C. (Durrans' Mercury Method) and a Gardner-Holdt viscosity of R–S at forty percent solids in butyl Carbitol. The resulting linear polyether polymer contains two terminal alcoholic hydroxyl groups and four intermediate alcoholic hydroxyl groups and has a molecular weight of approximately 1400.

*Part (b).*—To prepare a branched chain thermoplastic polyester having six branch chains, using the polyhydroxy polyether of Part (a) as the initiator, propylene oxide, polyhydroxy polyether, maleic anhydride and phthalic anhydride are employed in a mol ratio of 11 to ⅓ to 4 to 4. The polyhydroxy polyether (272.4 grams), maleic acid anhydride (224.4 grams), phthalic acid anhydride (338.4 grams), and propylene oxide (340.0 grams) are reacted together according to the procedure set forth in Example 1. The propylene oxide addition requires approximately fifteen hours. The temperature is then raised to 150° C. and held at this temperature until reflux ceases. The product, after being vacuum distilled for ten minutes at 2 mm. Hg, has the following constants: Acid value—1.9; viscosity—X–Y @ 66.7 percent solids in styrene; color—3–4 @ 66.7 percent solids in styrene.

Styrene (120 grams) containing 500 p.p.m. tertiary butyl catechol, the product of this example (180 grams), and catalyst (six grams) are blended together and processed into a casting using the procedure described in Example 1. The resulting casting is clear and rigid and possesses the following strength properties:

| | |
|---|---|
| Tensile strength _____p.s.i__ | 5700 |
| Flexure strength _____p.s.i__ | 9000 |
| Impact strength _____ft. lb./inch of notch__ | 0.27 |
| Alpha-hardness _____ | 97 |

Example 8

Using pyromellitic acid as the initiator, to prepare a polyester having four branch chains, propylene oxide, pyromellitic acid, maleic anhydride and phthalic anhydride are used in a mol ratio of 11 to ½ to 4 to 4. The pyromellitic acid (87.1 grams), maleic acid anhydride (268.9 grams), phthalic acid anhydride (406.1 grams) and propylene oxide (437.6 grams) are reacted together in accordance with Example 1. The addition of the propylene oxide requires approximately four hours. The temperature is then raised to 150° C. as reflux permits and held until reflux ceases. Volatiles are then distilled off under a vacuum of 2 mm. Hg for ten minutes after which the following constants are determined: Acid value—31; viscosity—Y–Z @ 66.7 percent solids in styrene; color—8–9 @ 66.7 percent solids in styrene.

Styrene (120 grams) containing 500 p.p.m. tertiary butyl catechol, the product of this example (180 grams), and catalyst (six grams) are blended together and made into a ⅛″ casting, using the procedure described in Example 1. The product is a clear, rigid casting, having the following strength properties:

| | |
|---|---|
| Tensile strength _____p.s.i__ | 7700 |
| Flexure strength _____p.s.i__ | 15,000 |
| Impact strength _____ft. lb./inch of notch__ | 0.29 |
| Alpha-hardness _____ | 115 |

Example 9

To prepare a branched chain polyester having six branch chains, using the polyhydroxy polyether of Part (a) of Example 7 as the initiator, butyl glycidyl ether, polyhydroxy polyether, maleic anhydride and phthalic anhydride are employed in a mol ratio of 8 to ⅓ to 4 to 4. The polyhydroxy polyether (226.8 grams), maleic acid anhydride (186.0 grams), phthalic acid anhydride (247.2 grams) are weighed into a two liter, three neck, round bottom flask, provided with a stirrer, thermometer, dropping funnel and six bulb water condenser, the latter attached directly to one neck of the flask. The flask contents are stirred continuously and heated to 150° C. At this temperature, butyl glycidyl ether (506.4 grams) is added through the dropping funnel over a period of approximately two hours. After this addition the flask contents are held at 150° C. After two hours, the acid value is found to be 21.2 and after five hours it is 18.5. The product is found to have the following constants: Acid value—18.4; viscosity—X–Y @ 66.7 percent solids in styrene; color—8–13 @ 66.7 percent solids in styrene.

Example 10

With phloroglucinol as the initiator, a branched chain thermoplastic polyester having three branch chains is prepared by reacting phloroglucinol (44.0 grams), maleic acid anhydride (106.5 grams), phthalic acid anhydride (160.5 grams) and propylene oxide (189.0 grams) following the procedure for Example 1. The mol ratio of monoepoxide (propylene oxide) to phloroglucinol to maleic anhydride to phthalic anhydride is 12 to 1 to 4 to 4. The addition of the propylene oxide to the flask contents requires approximately eight hours. The temperature of the flask contents is raised to 150° C. as reflux permits and held at this temperature until reflux ceases. A product results having the following constants: Acid value—30; viscosity—T–U @ 66.7 percent solids in styrene; color—18 @ 66.7 percent solids in styrene.

Example 11

To prepare a branched chain thermoplastic polyester having three branch chains, using raw castor oil as the initiator, propylene oxide, raw castor oil, maleic anhydride and phthalic anhydride are employed in a mol ratio of 9 to ⅓ to 5 to 5. The raw castor oil (166.0 grams), having a weight per alcoholic hydroxyl of 332, maleic acid anhydride (245.3 grams), phthalic acid anhydride (370.3 grams) and propylene oxide (300.0 grams) are reacted together as set forth in Example 1. The addition of the propylene oxide requires approximately eleven hours, after which the temperature is raised to 150° C. and held until reflux ceases. After vacuum distillation (ten minutes at 2 mm. Hg) the product is found to have the following properties: Acid value—73; viscosity—W–V @ 66.7 percent solids in styrene; color—9–10 @ 66.7 percent solids in styrene.

Styrene (120 grams) containing 500 p.p.m. tertiary butyl catechol, the product of Example 8 (180 grams), and catalyst (six grams) are blended together and processed into a casting using the procedure described in Example 1. The product is a clear, semi-rigid casting having the following strength properties:

| | |
|---|---|
| Tensile strength _____p.s.i__ | 7200 |
| Flexure strength _____p.s.i__ | 11,900 |
| Impact strength _____ft. lb./inch of notch__ | 0.31 |

Example 12

*Part (a).*—A 65–35 vinyl toluene-hydroxy propyl acrylate copolymer is prepared by combining (in the presence of 67 parts of a 50–50 mixture of xylene and methyl isobutyl ketone, in a flask equipped with condenser, thermometer and agitator) 65 parts of vinyl toluene, 15.5 parts of propylene oxide and 19.5 parts of acrylic acid (parts being based on a total of 100 parts for the three reactants). Catalysts for the process, 1.0 part of benzoyl peroxide and 2.0 parts of a 35 percent solution of benzyl trimethyl ammonium hydroxide in methanol, are added. The reaction mixture is refluxed until an acid value of less than one is obtained, approximately fourteen hours. The resulting 54.7 percent solids solution contains a hydroxyl-containing linear copolymer having a weight per hydroxyl group of 371. Since the average molecular weight of the copolymer is believed to be in the neighborhood of 20,000, each molecule contains an average of 50 to 60 hydroxyl groups.

*Part (b).*—To use the vinyl toluene-hydroxy propyl acrylate copolymer of Part (a) of this example as the initiator, a branched chain thermoplastic polyester, having from about fifty to sixty branch chains is prepared from a ratio of mols of monoepoxide (propylene oxide) to equivalents of copolymer to mols of phthalic anhydride of 5 to 1 to 5, the copolymer (145.5 grams of a 54.7 percent solids solution), phthalic acid anhydride (158.4 grams), xylene (134.0 grams), and propylene oxide (62.1 grams) are reacted in accordance with the procedure of Example 9, except that the reflux temperature is from 120 to 125° C. The addition of the propylene oxide requires approximately three hours. The flask contents are held at a moderate reflux for an additional six hours, at which time the temperature has reached 138° C. The product is cooled and combined with fifty grams of methyl isobutyl ketone. The acid value of the solids portion of the product is 9.4.

*Example 13*

A branched chain thermoplastic polyester having from about fifty to sixty branch chains is prepared using the vinyl toluene-hydroxy propyl acrylate copolymer of Example 12, Part (a) as the initiator. The ratio of mols of monoepoxide (propylene oxide) to equivalents of copolymer to mols of phthalic anhydride is 10 to 1 to 10. The theoretical molecular weight of each branch is 2062. The copolymer (83.2 grams of a 54.7 percent solids solution), phthalic acid anhydride (182.7 grams), xylene (162.4 grams), and propylene oxide (71.7 grams) are reacted in accordance with the procedure of Example 12. The propylene oxide is added to the flask contents over a period of approximately six hours, at a rate sufficient to maintain a moderate reflux at 120° C. to 125° C. Flask contents are held at moderate reflux for four hours after all the propylene oxide is added. A mixture of 150 grams of methyl isobutyl ketone and twenty grams of Cellosolve acetate is added to the product. The acid value of the solids portion of the product is 10.8.

*Example 14*

A branched chain thermoplastic polyester having from about fifty to sixty branch chains is prepared using the vinyl toluene-hydroxy propyl acrylate copolymer of Example 12, Part (a) as the initiator. The ratio of mols of monoepoxide (propylene oxide) to equivalents of copolymer to mols of phthalic anhydride is 20 to 1 to 20. The theoretical molecular weight of each branch is 4124. The copolymer (45.3 grams of a 54.7 percent solids solution), phthalic acid anhydride (197.7 grams), xylene (89.7 grams), methyl isobutyl ketone (89.6 grams), and propylene oxide (78.0 grams) are reacted in accordance with the procedure of Example 12. A portion of the propylene oxide (fifty grams) is added to the flask contents at 120° C. to 125° C. over a period of 4½ hours. After this portion of propylene oxide is added to the flask contents, they are held approximately four hours at a moderate reflux of 120° C. to 130° C. Benzyl trimethyl ammonium chloride crystals (three grams) are then added to the flask contents to catalyze the reaction. The additional 28 grams of propylene oxide are then added at 120° C. to 130° C. over a period of approximately forty minutes. The flask contents are then held at moderate reflux for an additional forty minutes. The product is then combined with Cellosolve acetate (fifty grams). The acid value of the solids portion of the product is 15.7.

*Example 15*

To prepare a carboxyl terminated branched chain thermoplastic polyester having from about fifty to sixty branch chains, the vinyl toluene-hydroxy propyl acrylate copolymer of Example 12 is used as an initiator. The ratio of mols of monoepoxide (propylene oxide) to equivalents of copolymer to mols of phthalic anhydride is 4 to 1 to 5. The initiator (221.0 grams of a 54.7 percent solids solution of the copolymer) and phthalic acid anhydride (212.8 grams) are weighed into a one liter flask equipped with stirrer, thermometer, dropping funnel and six bulb water condenser. The flask contents are heated to a temperature of 120° C. to 125° C. while being constantly stirred. Propylene oxide (66.4 grams) is added to the flask contents through the dropping funnel over a period of approximately two hours. At this point, xylene (fifty grams) is then added and the temperature is raised to reflux conditions (127° C. to 130° C.). The system is held at moderate reflux for another eighty minutes, at which time the reflux temperature is 138° C. to 140° C. Additional fifty grams of xylene and fifty grams of methyl isobutyl ketone are added and the product is allowed to cool. The following constants are determined on the product: Non-volatiles (two hours at 150° C.)— 57.9 percent; acid value (non-volatile portion)—54.3; viscosity (⅔ of the cooled product–⅓ styrene)—Q–R.

The foregoing examples illustrate the preparation of highly branched chain thermoplastic or linear polyesters according to this invention. The formation of the branched chain polyesters is initiated by the presence of small amounts of polyfunctional compounds containing active hydrogens which function as reaction centers or nuclei from which the branched chains emanate, the number of chains, as indicated, being equal to the functionality of the nucleus-forming compound. The preceding examples show the drop-wise addition of monoepoxide to the flask contents. It is understood, however, that other methods of preparing the polyesters of this invention can be used. Thus, while it is convenient to slowly add the monoepoxide, the three reactants can all be initially combined. In the case of an alcoholic hydroxyl initiator since the rate of reaction between this initiator and the monoepoxide is negligible compared to the reaction of alcoholic hydroxyls with anhydride, the reactions will proceed in the same order as those in the illustrative examples. In the case of a carboxyl or phenolic hydroxyl initiator the epoxide reacts first with the initiator to produce alcoholic hydroxyls which react with anhydride groups.

A feature of this invention is that it is theoretically possible to prepare hydroxyl, carboxyl, or hydroxyl-carboxyl terminated polyesters. Example 15 is illustrative of how, by using proper ratios of initiator to anhydride to monoepoxide a highly branched, high molecular weight polyester, whose branches terminate with carboxyl groups, can be prepared.

Another feature of the invention is that the saturated and unsaturated polyesters can be cured with aldehyde-amine or aldehyde-amide condensates such as urea-formaldehyde or melamine-aldehyde condensates (e.g., a fusible alkylated condensate of an aldehyde with urea or melamine) to give excellent film-forming compositions. In general, the branched polyester of this invention is reacted with about 30 to 70 percent by weight of aldehyde condensate, preferably with from 40 to 60 percent. This can best be illustrated by the following examples. The urea-formaldehyde resin used in the examples is a butylated urea-formaldehyde resin having a non-volatile content of sixty percent in a solvent mixture of 87.5 percent butyl alcohol, and 12.5 percent xylene and a viscosity of U-X.

*Example W*

10.0 grams of polyester of Example 1
16.7 grams of butylated urea-formaldehyde resin at sixty percent solids
10.3 grams of toluene
3.0 grams of Cellosolve acetate The above materials are mixed together by dissolving the polyester in the toluene and Cellosolve acetate, using heat to effect solution, and then adding the butylated urea-formaldehyde resin. This solution contains polyester and urea-formaldehyde resin solids in a 50–50 ratio. A three mil film of the above solution is deposited on a glass panel and baked thirty minutes at 150° C. A very well cured, clear film results which is exceptionally hard and mar-resistant and which has excellent flexibility and toughness properties.

*Example X*

10.0 grams of polyester of Example 2
16.7 grams of above butylated urea-formaldehyde resin at sixty percent solids
10.3 grams of toluene
3.0 grams of Cellosolve acetate A blend of the above materials is made by dissolving the polyester in the two solvents, using heat to aid in the dissolution, and then adding the butylated urea-formaldehyde resin. This solution contains polyester and urea-formaldehyde resin solids in a 50–50 ratio. A three mil film of the solution is deposited on a glass panel and baked thirty minutes at 150° C. The resulting cured film is exceptionally glossy and hard, and has outstanding flexibility, toughness, and adhesion properties.

*Example Y*

10.0 grams of polyester of Example 4
16.7 grams of above butylated urea-formaldehyde resin at sixty percent solids
10.3 grams of toluene
3.0 grams of Cellosolve acetate The above materials are blended together by dissolving the polyester in the two solvents by the aid of heat and then adding the butylated urea-formaldehyde resin. This solution contains polyester and urea-formaldehyde resin solids in a 50–50 ratio. A three mil film of the above solution is deposited on a glass panel and baked thirty minutes at 150° C. The cured film is clear and extremely hard and mar-resistant. The film also has exceptionally good flexibility, toughness, and adhesion properties.

*Example Z*

10.0 grams of polyester of Example 5
16.7 grams of above butylated urea-formaldehyde resin at sixty percent solids
10.3 grams of toluene
3.0 grams of Cellosolve acetate The above materials are blended together by dissolving the polyester in the two solvents with the aid of heat. The butylated urea-formaldehyde resin is then added. This solution contains polyester and urea-formaldehyde resin solids in a 50–50 ratio. A three mil film of the above blend is deposited on a glass panel and baked thirty minutes at 150° C. The resulting film has outstanding gloss, hardness, flexibility, mar-resistance, toughness, and adhesion properties.

As indicated hereinbefore, a feature of this invention is that polyesters can be prepared having a multiplicity of unsaturated branch chains. For example, when an unsaturated anhydride is employed, for example, mixtures of maleic acid anhydride and phthalic acid anhydride, polyester branches joined to the initiator will contain recurring double bonds. This class of unsaturated polyesters is of particular importance because the polyesters can be cured with compounds such as styrene, yielding excellent compositions. A further feature is that following the teachings of this invention more highly branched chain polyesters are prepared than known heretofore. Methods for preparing polyesters having a large number of branch chains are not readily available. Particularly methods are not available whereby polyesters can be prepared having a predetermined number of branch chains and approximately predetermined molecular weights.

Because of the valuable properties possessed by esters prepared in accordance with this invention and because they can be varied widely in physical properties, the polyesters described herein are suitable for decorative, industrial and maintenance finishes, adhesives, cable and wire coatings, laminates, molded plastic articles and the like. Plasticizers, pigments, dyes, reinforcing agents, and similar materials commonly used in formulating polymeric compositions can be used with the polyesters of this invention. Since such variations will occur to those skilled in the art, it is obvious that these embodiments are within the scope of this invention.

What is claimed is:

In the preparation of thermoplastic polyesters from dicarboxylic acid anhydrides and monoepoxides, the process for preparing branched chain polyesters having end groups which do not react with each other during preparation comprising including pentaerythritol as a reactant with the anhydride and monoepoxide, the four hydroxyl groups being equal to the number of branch chains of the polyester, reacting the pentaerythritol, the anhydride and the monoepoxide in a mol ratio of monoepoxide to dicarboxylic acid anhydride of 2:1 to 1:2, and in a mol ratio of anhydride plus monoepoxide to pentaerythritol greater than 7:1 depending on the desired length of branches, by heating the reactants at an elevated temperature below 150° C. sufficient to bring about a reaction of anhydride with alcoholic hydroxyl groups forming carboxyl groups, as well as a reaction of monoepoxide with the carboxyl groups forming additional hydroxyl groups and maintaining the temperature below that at which a carboxy-hydroxy reaction takes place so that end groups of polyester chains growing by the successive addition of anhydride and monoepoxide to the alcoholic hydroxyl groups do not react with each other and form water, said monoepoxide being selected from the group consisting of oxirane, alkyl oxiranes and ethers and esters, each containing a single 1,2-epoxy group as its sole reactive group.

References Cited in the file of this patent

UNITED STATES PATENTS

| | | |
|---|---|---|
| 1,922,459 | Schmidt | Aug. 15, 1933 |
| 1,990,615 | Rodrian et al. | Feb. 12, 1935 |
| 2,056,656 | Ellis | Oct. 6, 1936 |
| 2,197,855 | Ellis | Apr. 23, 1940 |
| 2,255,313 | Ellis | Sept. 9, 1941 |
| 2,652,424 | De Groote | Sept. 15, 1953 |
| 2,720,500 | Cody | Oct. 11, 1955 |
| 2,779,783 | Hayes | Jan. 29, 1957 |